United States Patent
Tsirkin et al.

(10) Patent No.: US 12,190,171 B2
(45) Date of Patent: Jan. 7, 2025

(54) MEMORY BALLOONING RELATED MEMORY ALLOCATION TECHNIQUES FOR EXECUTION ENVIRONMENTS

(71) Applicant: Red Hat, Inc., Raleigh, NC (US)

(72) Inventors: Michael Tsirkin, Yokneam Illit (IL); David Hildenbrand, Grasbrunn (DE)

(73) Assignee: Red Hat, Inc., Raleigh, NC (US)

( * ) Notice: Subject to any disclaimer, the term of this patent is extended or adjusted under 35 U.S.C. 154(b) by 65 days.

(21) Appl. No.: 18/094,121

(22) Filed: Jan. 6, 2023

(65) Prior Publication Data
US 2023/0153171 A1    May 18, 2023

Related U.S. Application Data

(63) Continuation-in-part of application No. 17/082,654, filed on Oct. 28, 2020, now Pat. No. 11,550,729.

(51) Int. Cl.
*G06F 9/50*    (2006.01)

(52) U.S. Cl.
CPC .......... *G06F 9/5077* (2013.01); *G06F 9/5016* (2013.01)

(58) Field of Classification Search
CPC .......... G06F 12/1009; G06F 9/45558; G06F 9/5016; G06F 12/023; G06F 12/109; G06F 2009/45583; G06F 2212/151
See application file for complete search history.

(56) References Cited

U.S. PATENT DOCUMENTS

| | | | |
|---|---|---|---|
| 9,268,678 B2 | 2/2016 | Tuch | |
| 9,459,900 B2 | 10/2016 | Tsirkin | |
| 9,720,722 B2 * | 8/2017 | Tsirkin | G06F 9/45558 |
| 9,910,768 B1 * | 3/2018 | Melekhova | G06F 9/5016 |
| 10,061,616 B2 * | 8/2018 | Tsirkin | G06F 9/5016 |
| 10,430,327 B2 | 10/2019 | Tsirkin | |

(Continued)

FOREIGN PATENT DOCUMENTS

CN    107168766 B    2/2020

OTHER PUBLICATIONS

Zhang et al., "iBalloon: Efficient VM Memory Balancing as a Service", IEEE International Conference on Web Services, 2016 8 pages https://ieeexplore.ieee.org/document/7557982.

(Continued)

*Primary Examiner* — Sean D Rossiter
(74) *Attorney, Agent, or Firm* — Dority & Manning, P.A.

(57) ABSTRACT

Systems and methods for ballooning related memory allocation techniques for execution environments. An example method may comprise maintaining, by an operating system of a hypervisor, a list of free memory pages associated with the execution environment, wherein each entry in the list references a set of memory pages that are contiguous in a guest address space; receiving, from a management application, a request for guest memory to be made available to the hypervisor, wherein the request comprises a minimum size of guest memory requested and a maximum size of guest memory; and responsive to identifying, by the operating system, in the list of free memory pages, a set of contiguous guest memory pages that is greater than or equal to the minimum size of memory requested, and less than or equal to the maximum size of memory requested, releasing the set of contiguous guest memory pages to the hypervisor.

20 Claims, 6 Drawing Sheets

(56) References Cited

U.S. PATENT DOCUMENTS

| | | | |
|---|---|---|---|
| 10,664,300 B2 | 5/2020 | Hildenbrand | |
| 2012/0030406 A1* | 2/2012 | Chang | G06F 12/126 |
| | | | 711/6 |
| 2017/0046255 A1* | 2/2017 | Tsirkin | G06F 12/023 |
| 2017/0068554 A1* | 3/2017 | Tsirkin | G06F 9/45558 |
| 2021/0157652 A1* | 5/2021 | Paraschiv | G06F 9/4843 |

OTHER PUBLICATIONS

Zhang et al., "Efficient Shared Memory Orchestration Towards Demand Driven Memory Slicing", IEEE 38th International Conference on Distributed Computing Systems, 2018 12 pages https://ieeexplore.ieee.org/document/8416384.

Zhu "Virtio Balloon", Mar. 12, 2020, 105 pages https://linuxlists.cc/l/1/linux-kernel/t/3496345/(rfc_for_linux)_virtio_balloon:_add_virtio_balloon_f_thp_order_to_handle_thp_spilt_issue.

* cited by examiner

MEMORY BALLOONING RELATED MEMORY ALLOCATION TECHNIQUES FOR EXECUTION ENVIRONMENTS

RELATED APPLICATION

This application is a continuation-in-part of U.S. patent application Ser. No. 17/082,654, filed Oct. 28, 2020, entitled "MEMORY BALLOONING RELATED MEMORY ALLOCATION TECHNIQUES FOR VIRTUAL MACHINES" issued as U.S. Pat. No. 11,550,729 on Jan. 10, 2023, the entire content of which is hereby incorporated by reference.

TECHNICAL FIELD

The present disclosure is generally related to virtualized computer systems, and more particularly, to memory ballooning related memory allocation techniques for execution environments.

BACKGROUND

Virtualization herein shall refer to abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines (also referred to herein as "guests" running on a host computer system) in order to improve the hardware utilization rate.

Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Device and input/output (I/O) virtualization involves managing the routing of I/O requests between virtual devices and the shared physical hardware.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
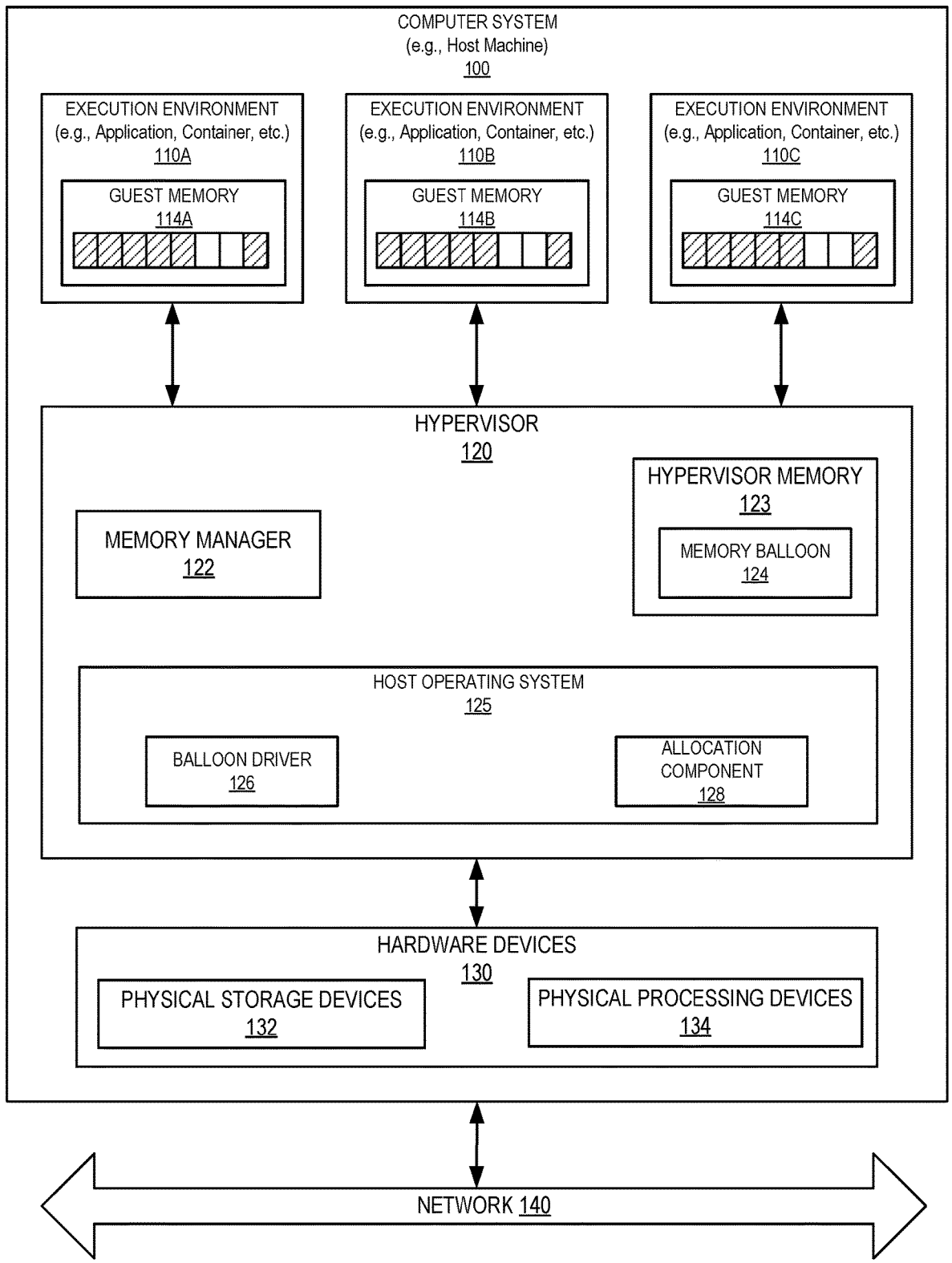
FIG. 1 depicts a high-level block diagram of an example host computer system that performs memory allocation for execution environments, in accordance with one or more aspects of the present disclosure.

Described herein are systems and methods for memory encryption for memory ballooning related memory allocation techniques for execution environments.

Memory ballooning is a dynamic memory management technique for execution environments (e.g., virtual machines, containers, applications, etc.) to allow the host system to reclaim unused memory from certain execution environments and allocate the reclaimed memory to other execution environments. In one example, an execution environment may release memory that is no longer being used to the hypervisor. The released memory may be placed in a reserved memory pool called a balloon. The hypervisor may then re-allocate the released memory in the balloon to other execution environments or for use by the hypervisor, host operating system, underlying hardware device, or a combination thereof. The released memory may then be removed from the balloon and returned to the execution environment at a later time.

In some systems, the hypervisor may request a size of guest memory (e.g., such as 2 MB, 8 MB, etc., or an amount of memory pages) to be made available to the hypervisor. "Memory page" herein shall refer to a contiguous portion of memory of a certain size. For example, a standard memory page may have the size of 4 KB, while a huge page may have the size of 2 MB or 1 GB. The execution environment may have memory pages that are free or can be freed and, thus, may search for such unused guest memory of the requested size. In some examples, the execution environment may allocate multiple portions of unused guest memory from different locations to satisfy the memory request. However, allocating portions from different locations may degrade performance of the execution environment due to memory fragmentation caused by breaking up contiguous partitions of guest memory, such as huge pages. In another example, the execution environment may break up a contiguous portion of unused guest memory until obtaining the requested size of guest memory. For example, responsive to a memory request of 2 MB, the execution environment may identify an 8 MB contiguous portion of unused guest memory, break up the portion into two 4 MB partitions, break up one of the 4 MB partitions into two 2 MB partitions, and release one of the two 2 MB partitions to the hypervisor. However, allocating large portions of contiguous memory depletes the amount of contiguous free memory available on the execution environment, which also may degrade performance of the execution environment due to memory fragmentation. Fragmentation of the guest memory may lead to performance degradation because the execution environment may not be able to satisfy large, contiguous memory allocation requests from applications. As such, it is desirable to prevent guest memory fragmentation from placing guest memory portions in a reserved memory pool and releasing host memory to the hypervisor (e.g., inflating a memory balloon).

Aspects of the present disclosure address the above and other deficiencies by implementing memory ballooning related memory allocation techniques for execution environments. In particular, aspects of the present disclosure provide technology that allows a hypervisor to specify a size range of requested guest memory, and inflate a memory balloon with any sized set of guest memory within the requested range. This allows the hypervisor to minimize fragmentation when inflating the memory balloon increasing the likelihood that the hypervisor may identify a portion of guest memory the exact size of the memory request, rather than allocating multiple portions of unused guest memory or breaking up a contiguous portion of guest memory. In an example, the hypervisor may maintain a list of free (e.g., unused) memory pages for each execution environment (e.g., for one or more containers). The list may be included in a data structure, such as, for example, a table. Each entry in the list may reference a set of memory pages that are contiguous in a guest address space. For example, each entry may be one or more contiguous standard memory pages, one or more contiguous huge pages, or any combination thereof. The operating system of the hypervisor may receive a request, from a management application, for guest memory to be made available to the hypervisor. The request may include a range of the desired size of guest memory. For example, the request may include a minimum size of guest memory requested and a maximum size of guest memory. The operating system may then identify a set of contiguous guest memory in the list of free memory pages that is that is greater than or equal to the minimum size of memory requested, and less than or equal to the maximum size of memory requested. The operating system may then release the set of contiguous guest memory to the hypervisor. The released memory may be placed in a reserved memory pool (e.g., a balloon).

In an illustrative example, an execution environment may include entries of 2 MB, 2 MB, 5 MB, and 8 MB of free memory pages. The hypervisor may request a minimum of 4 MB of guest memory, and a maximum of 6 MB of guest memory. In response, the operating system of the hypervisor may query the list of free memory pages, and identify the 5 MB entry. The operating system may then release memory pages associated with the 5 MB entry to the hypervisor. In conventional systems, the hypervisor may have allocated both 2 MB portions, or broken up the 8 MB portion into two 4 MB portions to allocate a 4 MB portion. Both scenarios would have increased memory fragmentation.

Various aspects of the above referenced methods and systems are described in details herein below by way of examples, rather than by way of limitation. The examples provided below discuss a virtualized computer system where memory movement may be initiated by aspects of a hypervisor, a host operating system, a virtual machine, or a combination thereof. In other examples, the memory movement may be performed in a non-virtualized computer system that is absent a hypervisor or other virtualization features discussed below.

FIG. 1 depicts an illustrative architecture of elements of a computer system 100, in accordance with an implementation of the present disclosure. It should be noted that other architectures for computer system 100 are possible, and that the implementation of a computing device utilizing implementations of the disclosure are not necessarily limited to the specific architecture depicted. Computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computing device 100 may be a computing device implemented with x86 hardware. In another example, computing device 100 may be a computing device implemented with PowerPC®, SPARC®, or other hardware. In the example shown in FIG. 1, computing device 100 may include execution environments 110A-C, hypervisor 120, hardware devices 130, and a network 140.

Hypervisor 120, also be known as a virtual machine monitor (VMM), may manage the execution of one or more execution environments and provide the execution environments with access to one or more underlying computing devices (e.g., hardware or virtualized resources). Hypervisor 120 may interact with hardware devices 130 and provide hardware virtualization, operating-system virtualization, other virtualization, or a combination thereof. Hardware virtualization may involve the creation of one or more virtual machines that emulate an instance of a physical computing machine. Operating-system-level virtualization may involve the creation of one or more virtual machines that emulate an instance of an operating system. In one example, hypervisor 120 may be part of a non-virtualized operating system that is absent hardware virtualization and operating-system-level virtualization and each of the execution environments 110A-C may be an application process managed by the non-virtualized operating system. In another example, each of execution environments 110A-C may be or execute within a separate virtual machine or container. In either example, the hypervisor may be implemented as part of a kernel and execute as one or more processes in kernel space (e.g., privileged mode, kernel mode, root mode).

In the example shown, hypervisor 120 may run directly on the hardware of computer system 100 (e.g., bare metal hypervisor). In other examples, hypervisor 120 may run on or within a host operating system (not shown). Hypervisor 120 may manage system resources, including access to hardware devices 130, and may manage execution of execution environments 110A-C on a host machine. This includes provisioning resources of a physical central processing unit ("CPU") to each execution environment 110A-C running on the host machine. Provisioning the physical CPU resources may include associating one or more vCPUs with each execution environment 110A-C. VCPUs may be provisioned by a core of the physical host CPU or a number of time slots reserved from one or more cores of the physical host CPU. VCPUs may be implemented by an execution thread that is scheduled to run on a physical host CPU. Software executing in execution environment 110A-C may operate with reduced privileges such that hypervisor 120 retains control over resources. Hypervisor 120 retains selective control of the processor resources, physical memory, interrupt management, and input/output ("I/O").

Execution environments 110A-C may include a sequence of instructions that can be executed by one or more processing devices (e.g., physical processing devices 134). A execution environment may be managed by hypervisor 120 or may be a part of hypervisor 120. For example, hypervisor 120 may execute as one or more execution environments that cooperate to manage resources accessed by execution environments 110A-C. Each execution environment may include one or more processing threads, processes, other stream of executable instructions, or a combination thereof.

A processing thread ("thread") may be the smallest sequence of programmed instructions managed by hypervisor 120. A process may include one or more threads and may be an instance of an executable computer program.

In some implementations, execution environment 110A-C may be an executable container (hereafter "container") or run a container. Containers may include application images built from pre-existing application components and source code of users managing the application. An image may refer to data representing executables and files of the application used to deploy functionality for a runtime instance of the application. In one implementation, the image can be built using a Docker™ tool and is referred to as a Docker image. In other implementations, the application images can be built using other types of containerization technologies. An image build system (not pictured) can generate an application image for an application by combining a preexisting ready-to-run application image corresponding to core functional components of the application (e.g., a web framework, database, etc.) with source code specific to the application provided by the user. The resulting application image may be pushed to an image repository (not shown) for subsequent use in launching instances of the application images for execution.

In various implementations, a container may be a secure process space on the execution environment 110A-C to execute functionality of an application. A process space is the volume of memory which is allocated for potential memory addresses related to a computing device. In some implementations, a container is established at execution environment 110A-C with access to certain resources of the underlying node, including memory and storage. In one implementation, containers may be established using the Linux Containers (LXC) method. In further implementations, containers may also be established using cgroups, SELinux™, and kernel namespaces, to name a few examples.

In some implementations, execution environment 110A-C may execute guest executable code that uses an underlying emulation of physical resources, such as, for example, guest memory 114A-C. Guest memory 114A-C may be any virtual memory, logical memory, physical memory, other portion of memory, or a combination thereof for storing, organizing, or accessing data. Guest memory 114A-C may represent the portion of memory that is designated by hypervisors 120 for use by one or more respective execution environments 110A-C. Guest memory 114A-C may be managed by host operating system 125 and may be segmented into guest pages. The guest pages may each include a contiguous or non-contiguous sequence of bytes or bits and may have a page size that is the same or different from a memory page size used by hypervisor 120. Each of the guest page sizes may be a fixed-size, such as a particular integer value (e.g., 4 KB, 2 MB) or may be a variable-size that varies within a range of integer values.

In the example shown in FIG. 1, hypervisor 120 may include memory manager 122, guest operating system 125, and hypervisor memory 123. Hypervisor memory 123 (e.g., host memory) may be the same or similar to the guest memory and may be managed by hypervisor 120. Hypervisor memory 123 may be segmented into host pages, which may be in different states. The states may correspond to unallocated memory, memory allocated to guests, and memory allocated to hypervisor(s). The unallocated memory may be host memory pages and guest memory pages that have not yet been allocated by hypervisor memory 123 or were previously allocated by hypervisor 120 and have since been deallocated (e.g., freed) by hypervisor 120. The memory allocated to guests may be a portion of hypervisor memory 123 that has been allocated by hypervisor 120 to execution environment 110A-C and corresponds to guest memory of execution environment 114A-C. Other portions of hypervisor memory may be allocated for use by hypervisor 120, host operating system 125, hardware device, other module, or a combination thereof. Hypervisor memory may include memory balloon 124, discussed below.

Host operating system 125 may include executable code that manages applications, device drivers, execution environments 110A-C, other executable code, or a combination thereof. Host operating system 125 may include operating systems such as, for example, Microsoft® Windows®, Linux®, Solaris®, etc. may execute operations that manage guest memory 114A-C, memory balloon 124, balloon driver 126, and allocation component 128 respectively. Balloon driver 126 and allocation component 128 are used by way of example, and may be any type of device driver, application, program, etc.

Memory manager 122 may be a management application that enables memory balloon operations by allowing hypervisor 120 to obtain and use memory pages from execution environment 110A-C using, for example, memory balloon 124, balloon driver 126 and/or allocation component 128. Memory ballooning generally refers to a method of virtual memory management that allows hypervisor 120 to use memory allocated to any one of execution environment 110A-C. Memory manager 122 may further track and manage mappings between guest memory 114A-C and hypervisor memory 123. For example, memory manager 122 may maintain a table, list or other structure that associates an address of guest memory 114A-C (e.g., a guest address) with an address of corresponding hypervisor memory 123 (e.g., a host address).

Balloon driver 126 may be a computer program installed on host operating system 125 used to perform memory balloon operations involving guest memory 114A-C. In an example, hypervisor 120 uses balloon driver 126 to perform memory balloon operations involving guest memory 114A-C. For example, hypervisor 120 may use balloon driver 126 to inflate and deflate memory balloon 124 to reclaim or return guest memory 114A-C from/to execution environment 110-C. Balloon driver 126 may be loaded into host operating system 125 as a pseudo-device driver, and may have no external interface to host operating system 125. Accordingly, balloon driver 126 may not be known to host operating system 125, and hypervisor 120 may communicate with balloon driver 126 over a private communication channel. In some implementations, a single balloon driver 126 may be used for two or more execution environments 110A-C. In other implementations, each execution environment 110A-C may be assigned a respective balloon driver 126.

Memory balloon 124 may be a reserved memory pool inaccessible to execution environment 110A-C. For example, memory pages that have been placed in memory balloon 124 may be hidden from execution environment 110A-C, inaccessible to execution environment 110A-C, or protected from execution environment 110A-C access. In one example, memory balloon 124 may refer to a classification or status of memory. For example, memory pages removed from guest memory 114A-C may be tagged with a status (e.g., "reserved," "unavailable," etc.) to indicate that corresponding memory pages may not be used by execution environment 110A-C. In some implementations, a singe memory balloon 124 may be used for two or more execution environments 110A-C. In other implementations, each execution environment 110A-C may be assigned a respective memory balloon 124.

In an example, execution environment 110A-C may have guest memory 114A-C that is free or can be freed. Memory ballooning allows hypervisor 120 to use memory allocated to execution environment 110A-C. Hypervisor 120 may borrow memory allocated to execution environment 110A-C by inflating memory balloon 124. For example, memory manager 122 may send a memory request to balloon driver 126 over the private communication channel. The memory request may specify a target memory balloon 124 size or size range corresponding to an amount of memory sought by hypervisor 120. The balloon driver 126 may inflate memory balloon 124 in response to receiving a request for guest memory 114A-C from memory manager 122. In some implementations, balloon driver 126 may inflate a memory balloon 124 by pinning memory pages from guest memory 114A-C in the memory balloon 124. In some implementations, balloon driver 126 inflates a memory balloon 124 by placing a number of memory pages from guest memory 114A-C in a reserved area of host operating system 125 associated with memory balloon 124. For example, the reserved area may be inaccessible to the execution environment 110A-C and/or may prevent execution environment 110A-C from performing operations involving memory pages pinned in memory balloon 124.

Allocation component 128 may enable hypervisor 120 to specify a size range of requested guest memory and may enable execution environment 110A-C to inflate memory balloon 124 with a set of guest memory within the requested range. In particular, allocation component 128 may maintain a list of unused guest memory 114A-C. For example, allocation component 128 may maintain a list where each entry references a set of free memory pages contiguous in the guest address space. Each entry may be one or more contiguous standard memory pages, one or more contiguous huge pages, or any combination thereof. The list may be included in a data structure, such as, for example, a table.

Further, allocation component 128 may receive memory requests from hypervisor 120 via, for example memory manager 122. Each memory request may include a size range of desired guest memory. In particular, the request may include a minimum size of guest memory requested and a maximum size of guest memory. For example, the memory request may specify a size of guest memory requested (e.g., 2 KB, 5 MB, 1 GB, etc.), an amount of one or more types of memory pages requested (e.g., 12 standard memory pages, 4 huge memory pages, etc.) or any combination thereof. Responsive to the memory request, memory allocation component 128 may identify an entry from the list of a set of unused guest memory that is greater than or equal to the minimum size of memory requested, and less than or equal to the maximum size of memory requested. The allocation component 128 may then instruct the balloon driver 126 to inflate the balloon driver 125 with the guest memory from the identified entry. Allocation component 128 is discussed in more detail below in regards to FIG. 2.

In some implementations, memory manager 122 may be associated with a particular level of privilege that may be the same or similar to protection levels (e.g., processor protection rings). The privilege level may indicate an access level to computing devices (e.g., memory, processor, or other virtual or physical resources). In one example, the privilege levels may correspond generally to a user mode (e.g., reduced privilege mode, non-root mode, non-privileged mode) and a hypervisor mode (e.g., enhanced privilege mode, kernel mode, root mode). In some implementations, memory manager may execute in a user mode to access resources assigned to the execution environments and may be restricted from accessing resources associated with kernel space or with another user space process (e.g., other portion of user space). In some implementations, balloon driver and allocation component may execute in the hypervisor mode to access resources associated with the kernel space and the user space. In other examples, there may be a plurality of privilege levels, and the privilege levels may include a first level (e.g., ring 0) associated with a hypervisor/kernel, a second and third level (e.g., ring 1-2), and a fourth level (e.g., ring 3) that may be associated with user space applications. In some implementations, memory manager 122 may communicate with memory balloon 124, balloon driver 126 and/or allocation component 128 using a context switch (e.g., system call or hypercall).

Hardware devices 130 may provide hardware resources and functionality for performing computing tasks. Hardware devices 130 may include one or more physical storage devices 132, one or more physical processing devices 134, other computing devices, or a combination thereof. One or more of hardware devices 130 may be split up into multiple separate devices or consolidated into one or more hardware devices. Some of the hardware device shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices (e.g., random access memory (RAM)), non-volatile memory devices (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 may include one or more processors that are capable of executing the computing tasks. Physical processing devices 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 134 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

Network 140 may be a public network (e.g., the internet), a private network (e.g., a local area network (LAN), a wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
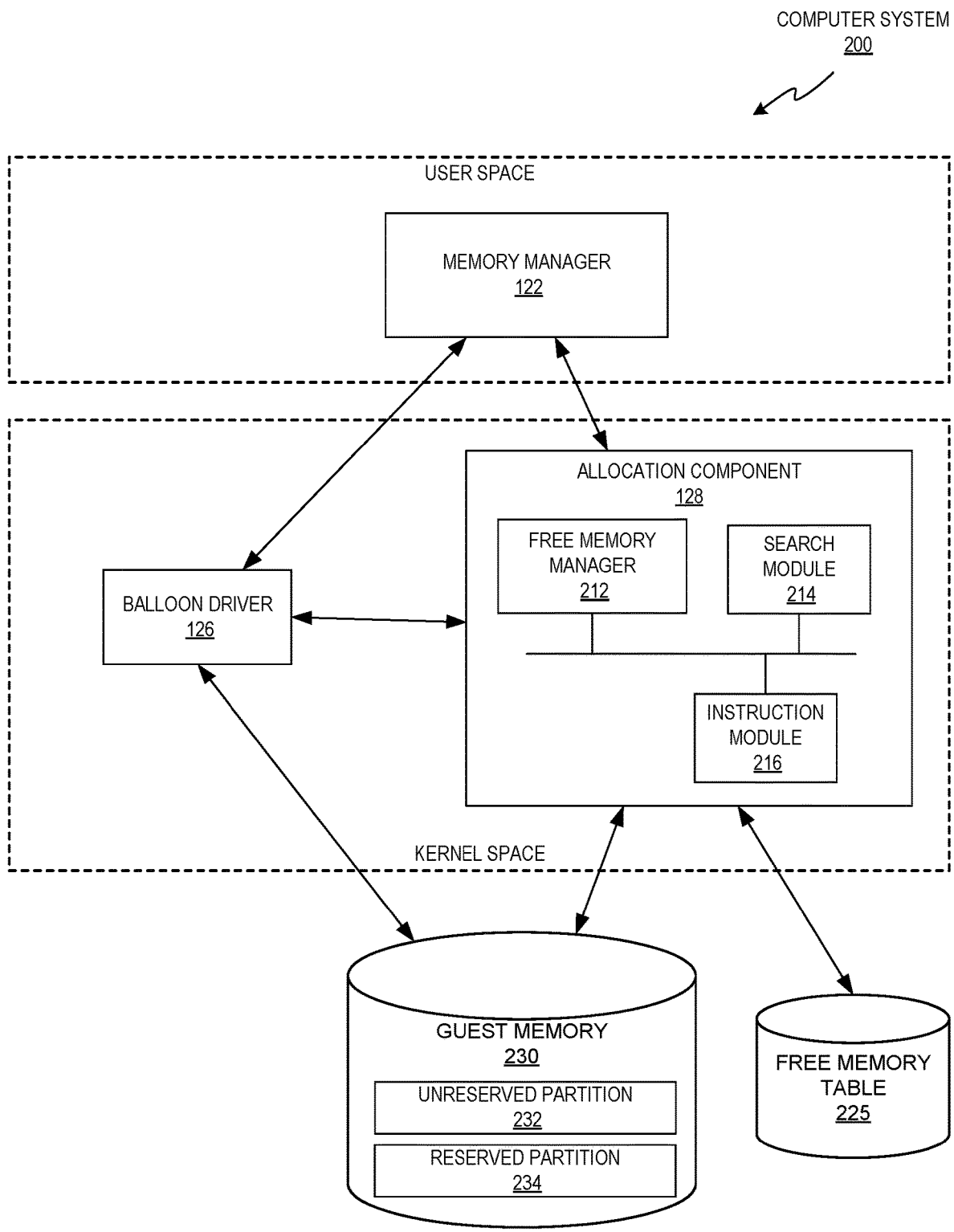
FIG. 2 depicts a block diagram illustrating components and modules of an example computer system, in accordance with one or more aspects of the present disclosure.

FIG. 2 is a block diagram illustrating example components and modules of computer system 200, in accordance with one or more aspects of the present disclosure. Computer system 200 may comprise executable code that implements one or more of the components and modules and may be implemented within a hypervisor, a host operating system, a guest operating system, hardware firmware, or a combination thereof. In the example shown, computer system 200 may include allocation component 128, balloon driver 126, memory manager 122, and guest memory 230. Allocation component 128 may include free memory manager 212, search module 214, and instruction module 216. Guest memory 230 may be similar to guest memory 114A-C, and may include unreserved partition 232 and reserved partition 234. Unreserved partition 232 may include any portion of guest memory (e.g., guest memory pages) that is available for use by a execution environment (e.g., execution environment 110A-C). Reserved partition 234 may include any portion of guest memory that is used to inflate a memory balloon (e.g., memory balloon 124). For example, the memory pages in reserved partition 234 may be pinned in the memory balloon or placed in a reserved area of the host operating system associated with the memory balloon (thus inaccessible to the execution environment). In some implementations, memory manager 122 may operate in user space, while balloon driver 126 and allocation component 128 may operate in kernel space.

Free memory manager 212 may maintain a list free (e.g., unused) memory pages in free memory table 225. The list of free memory pages may relate to one or more execution environments 110A-C (e.g., guest memory of a container). Free memory table 225 may be any type of data structure used to store records of memory pages that are contiguous in a guest address space. Each entry in the free memory table 225 may reference a set of one or more contiguous standard memory pages, one or more contiguous huge pages, or any combination thereof. In some implementations, free memory manager 212 may implement a buddy memory allocation technique and free memory pages may be maintained in a buddy allocated data structure. The buddy memory allocation technique is an algorithm that manages memory in power of two increments. In particular, guest memory may be broken up into blocks of pages where each block is a power of two number of pages. The exponent for the power of two sized block may be referred to as an order. For example, order 0 may be indicative of free page blocks of size $2^0$ (e.g., one memory page), order 1 may be indicative of free page blocks of size $2^1$ (e.g., two memory pages), order 10 may be indicative of free page blocks of size $2^{10}$ (e.g., 1024 memory pages), etc. If a block of a desired size is not available, a larger block may be broken up in half, where one half may be used for allocation consideration and the other half is placed into free memory table 225 for a lower order. If the half used for consideration is too large, then the half may be further broken up into two more halves, and so on until the desired size is available. This allows allocation component 128 to divide the guest memory into partitions to satisfy a memory request.

Memory manager 122 may send a memory request to allocation component 128 for guest memory to be made available to the hypervisor. In an example, memory manager 122 may send the memory request in response to detecting a low amount of available hypervisor memory 123 by examining resources or performance counters. In another example, memory manager 122 may receive a notification from performance monitoring software indicating that a low hypervisor memory 123 condition exists. The memory request may specify a size range of guest memory requested. For example, the memory request may include a minimum size of guest memory requested and a maximum size of guest memory requested. In some implementations, the minimum size may be a standard memory page and the maximum size may be a huge page. In some implementations, the minimum size may be a huge page and the maximum size may be multiple huge pages. Those skilled in the art would understand that any size may be used for the minimum size of guest memory requested and the maximum size of guest memory requested.

Search module 214 may search free memory table 225 for a set of guest memory that is within the size range specified in the memory request. In an example, search component may begin the looking up the smallest available order and determining whether the block size of that order will satisfy the memory request. Responsive to the block size not satisfying the memory request, search module 214 may move towards the next smallest available order. Once an entry is located that can satisfy the memory request (e.g., a block size between the minimum size of guest memory requested and the maximum size of guest memory requested), instruction module 216 may instruct the balloon driver 126 to mark the memory pages that are correlated to that entry as reserved (e.g., inflate the memory balloon), and release the memory pages to the memory manager 112. Free memory manager 212 may then update the free memory table 225 by removing the entry.

In an illustrative example, free memory table 225 may include entries of 4 KB, 1 MB, 2 MB, and 4 MB of free memory pages. The hypervisor may request a minimum of ½ MB of guest memory, and a maximum of 2 MB of guest memory. In response, search module 214 may query the free memory table 225 starting from the smallest available order, and identify the 4 KB entry. Free memory manager 212 may determine that the 4 KB entry will not satisfy the memory request, then move towards the next smallest available order, and identify the 1 MB entry. Since the 1 MB entry is greater than the minimum requested size of ½ MB, and less than the maximum requested size of 2 MB, instruction module 216 may then instruct balloon driver 220 to release the block of memory pages of the 2 MB entry to the hypervisor.

In some implementations, free memory table 225 may not include an entry to satisfy a memory request. Accordingly, the search module 214 may identify an entry with a set of contiguous memory pages larger than the size range of the memory request. The instruction module 216 may then break up the identified set until a portion of the set can satisfy the memory request, upon which that portion may be released to the hypervisor. The remainder of the set may be placed into free memory table 225 for a lower order. As such, a set of contiguous memory pages is not broken up unless it exceeds the maximum requested size.

In an illustrative example, free memory table 225 may include entries of 4 KB, 4 MB, and 8 MB of contiguous free memory pages. The hypervisor may request a minimum of ½ MB of guest memory, and a maximum of 2 MB of guest memory. In response, search module 214 may query the free memory table 225 starting from the smallest available order, and identify the 4 KB entry. Free memory manager 212 may determine that the 4 KB entry will not satisfy the memory request, then move towards the next smallest available order, and identify the 4 MB entry. Since the 4 MB block is greater than the maximum requested size of 2 MB, instruction module 216 may instruct memory manager 212 to break up the block into two blocks of 2 MB each, and update the free memory table 225. Search module 214 may then select one of 2 MB blocks, determine that the block is greater than the minimum requested size of ½ MB, and equal to the maximum requested size of 2 MB, and instruction module 216 may instruct balloon driver 126 to release this block of memory pages to the hypervisor.

In some implementations, search module 214 may not identify any suitable entries in free memory table 225. Accordingly, instruction module 216 may instruct the execution environment to page-out (e.g., write memory pages to disk) a portion of guest memory to free some guest memory. Free memory manger 212 may then update free memory table 225 and search module 214 may initiate the search process again by querying free memory table 225 starting from the smallest available order. In some implementations, free memory manager 212 may periodically analyze guest memory 230 to update the free memory table 225.

Figure 3:
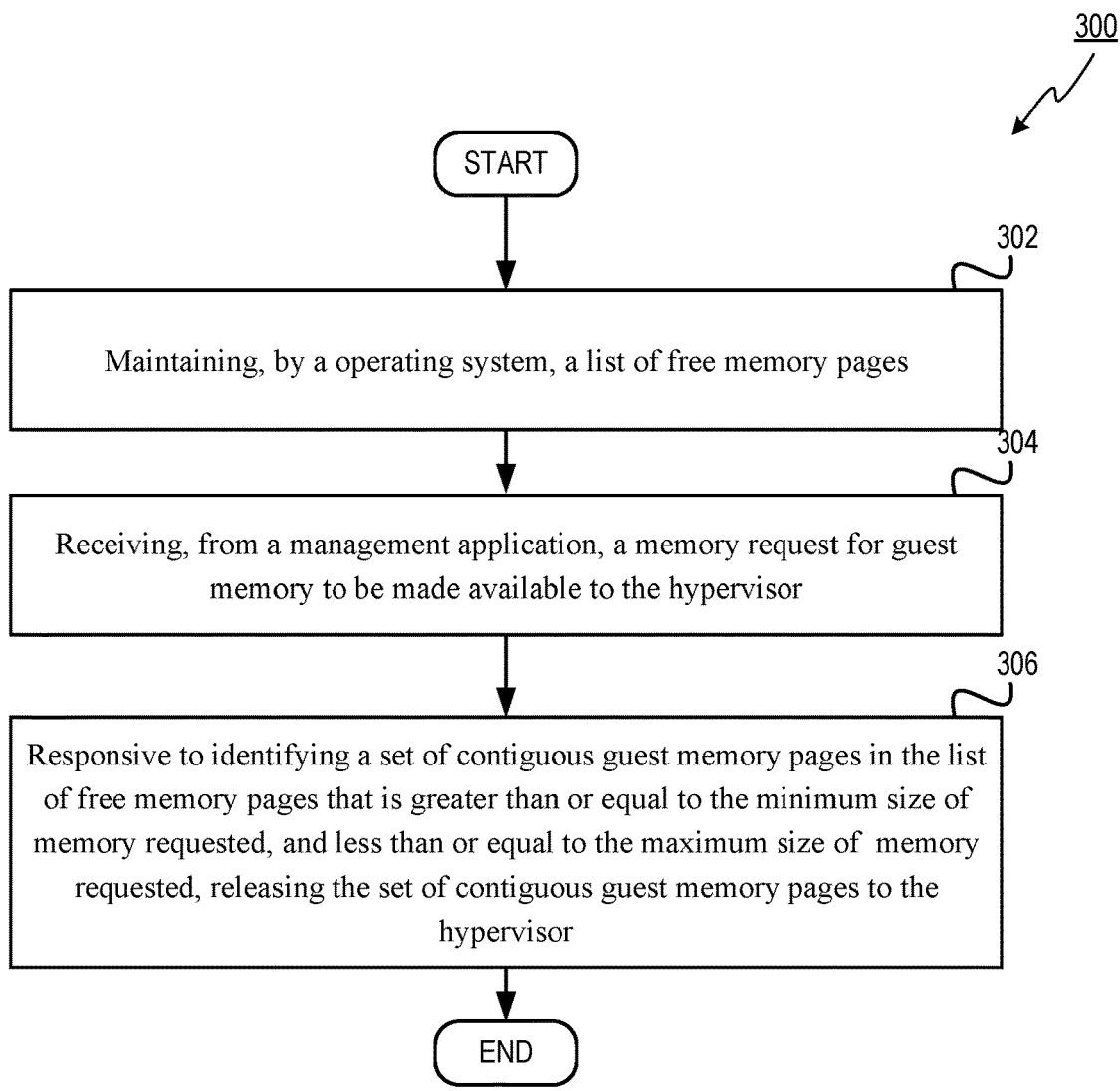
FIG. 3 depicts a flow diagram of an example method for inflating a memory balloon with a set of guest memory within a requested range, in accordance with one or more aspects of the present disclosure.

FIG. 3 depicts a flow diagram of an illustrative example of a method 300 for inflating a memory balloon with a set of guest memory within a requested range, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a kernel of a hypervisor as shown in FIG. 1 or by an executable code of a host machine (e.g., host operating system or firmware), an execution environment (e.g., guest operating system or virtual firmware), other executable code, or a combination thereof.

Method 300 may be performed by processing devices of a server device or a client device and may begin at block 302. At block 302, the operating systems of a hypervisor running an execution environment maintains a list of free memory pages related to the execution environment. Each entry in the list may reference a set of memory pages that are contiguous in a guest address space. The list may be maintained in a buddy allocated data structure. In some implementations, the execution environment may be a container, a virtual machine, an application, etc.

At block 304, the operating system of the hypervisor receives, from an application executing on the hypervisor, a memory request for guest memory to be made available to the hypervisor. The memory request may include a minimum size of guest memory requested and a maximum size of guest memory. For example, the minimum size of memory requested may be a standard memory page and the maximum size of memory requested may be a huge page. In some implementations, the request may be sent using a system call or a hypercall.

At block 306, responsive to identifying a set of contiguous guest memory pages in the list of free memory pages that is greater than or equal to the minimum size of memory requested, and less than or equal to the maximum size of memory requested, the operating system releases the set of contiguous guest memory pages to the hypervisor. For example, the operating system may identify the smallest set of contiguous guest memory pages that is greater than or equal to the minimum size of the memory requested and less than or equal to the maximum size of memory requested. The released set of contiguous guest memory pages may be placed in a reserved memory pool (e.g., a memory balloon).

In some implementations, responsive to failing to identify, in the list of free memory pages, a set of contiguous guest memory pages that is greater than or equal to the minimum size of memory requested and less than or equal to the maximum size of memory requested, the operating system may satisfy the memory request by allocating a part of a portion of guest memory greater than the maximum size of memory requested (e.g., break apart a portion of guest memory). In some implementations, responsive to failing to identify, in the list of free memory pages, a set of contiguous guest memory pages that is greater than or equal to the minimum size of memory requested and less than or equal to the maximum size of memory requested, the operating system may page-out a portion of guest memory. Responsive to completing the operations described herein above with references to block 306, the method may terminate.

Figure 4:
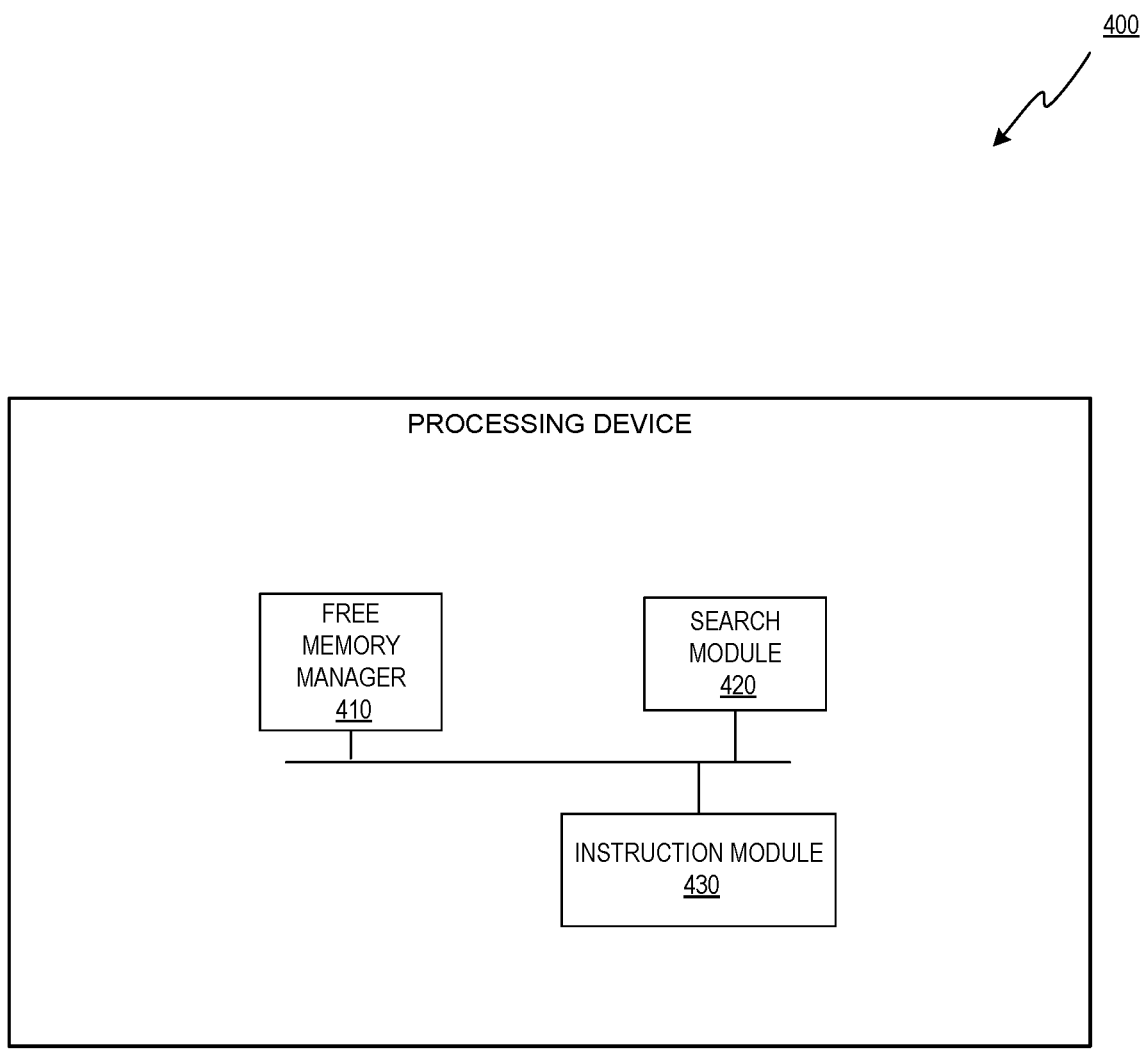
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computer system 200 and computing device 100 and may include one or more processing devices and one or more memory devices. In the example shown, computer system 400 may include free memory manager 410, search module 420, and an instruction module 430.

Free memory manager 410 may maintain a list of free memory pages related to an execution environment. Each entry in the list may reference a set of memory pages that are contiguous in a guest address space. The list may be maintained in a buddy allocated data structure.

Search module 420 may receive, from an management application of a hypervisor, a memory request for guest memory to be made available to the hypervisor. The memory request may include a minimum size of guest memory requested and a maximum size of guest memory. For example, the minimum size of memory requested may be a standard memory page and the maximum size of memory requested may be a huge page. Search module 420 may search the list of free memory pages for a set of memory pages to satisfy the memory request.

Responsive to search module 420 identifying a set of contiguous guest memory pages in the list of free memory pages that is greater than or equal to the minimum size of memory requested, and less than or equal to the maximum size of memory requested, instruction module 430 may release the set of contiguous guest memory pages to the hypervisor. For example, search module 420 may identify the smallest set of contiguous guest memory pages that is greater than or equal to the minimum size of the memory requested and less than or equal to the maximum size of memory requested. The released set of contiguous guest memory pages may be placed in a reserved memory pool (e.g., a memory balloon).

In some implementations, responsive to failing to identify, in the list of free memory pages, a set of contiguous guest memory pages that is greater than or equal to the minimum size of memory requested and less than or equal to the maximum size of memory requested, the free memory manager 410 may satisfy the memory request by allocating a part of a portion of guest memory greater than the maximum size of memory requested (e.g., break apart a portion of guest memory). In some implementations, responsive to failing to identify, in the list of free memory pages, a set of contiguous guest memory pages that is greater than or equal to the minimum size of memory requested and less than or equal to the maximum size of memory requested, the instruction module may page-out a portion of guest memory.

Figure 5:
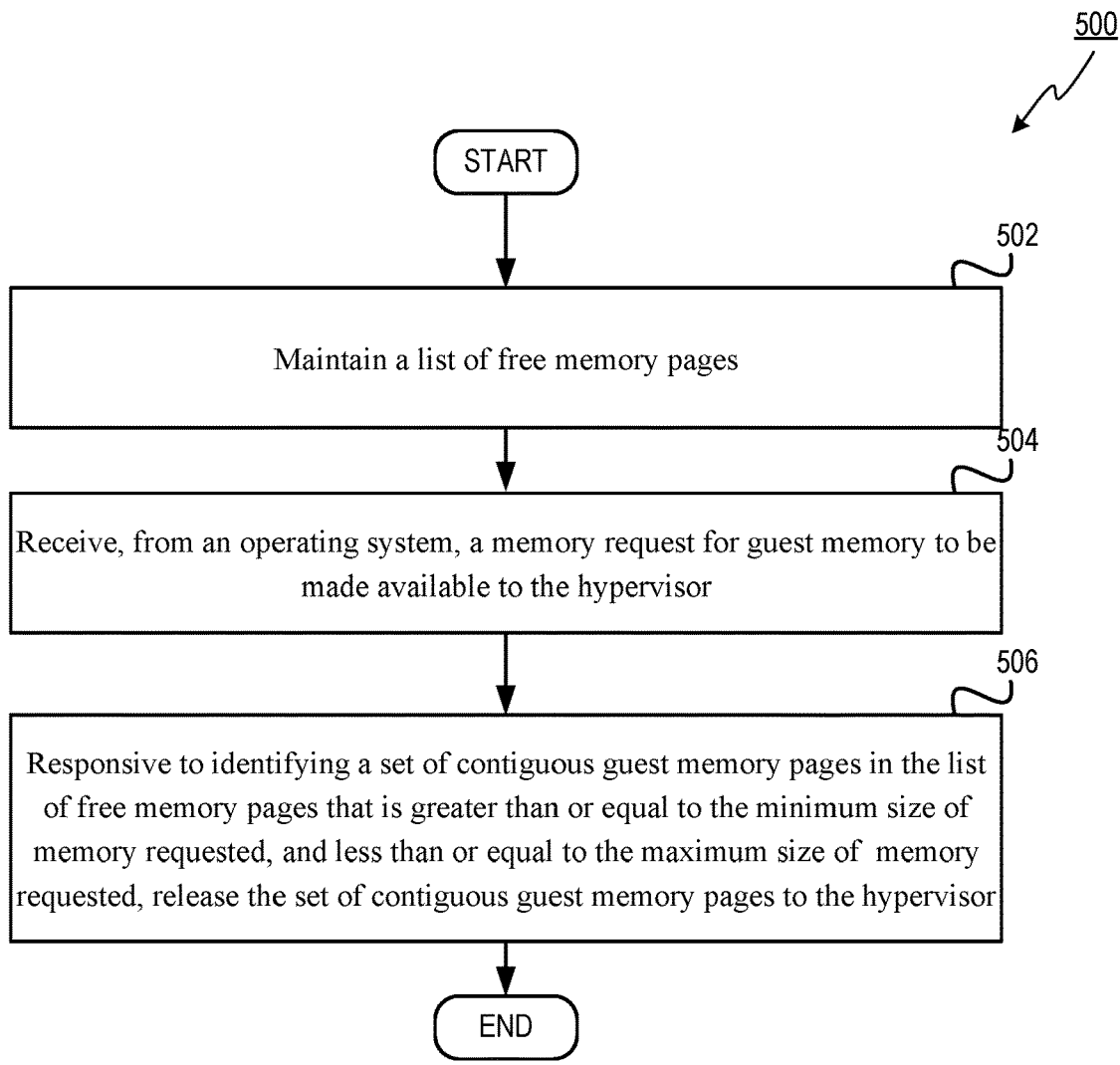
FIG. 5 depicts a flow diagram of another example method for inflating a memory balloon with a set of guest memory within a requested range, in accordance with one or more aspects of the present disclosure.

FIG. 5 depicts a flow diagram of one illustrative example of a method 500 for inflating a memory balloon with a set of guest memory within a requested range, in accordance with one or more aspects of the present disclosure. Method 500 may be similar to method 500 and may be performed in the same or a similar manner as described above in regards to method 300. Method 500 may be performed by processing devices of a server device or a client device and may begin at block 502.

At block 502, a processing device maintains a list of free memory pages. Each entry in the list may reference a set of memory pages that are contiguous in a guest address space. The list may be maintained in a buddy allocated data structure. In some implementations, the processing device may run a container, a virtual machine, an application, etc.

At block 504, the processing device receives, from a management application of a hypervisor, a memory request for guest memory to be made available to the hypervisor. The memory request may include a minimum size of guest memory requested and a maximum size of guest memory. For example, the minimum size of memory requested may be a standard memory page and the maximum size of memory requested may be a huge page.

At block 506, responsive to identifying a set of contiguous guest memory pages in the list of free memory pages that is greater than or equal to the minimum size of memory requested, and less than or equal to the maximum size of memory requested, the processing device releases the set of contiguous guest memory pages to the hypervisor. For example, the processing device may identify the smallest set of contiguous guest memory pages that is greater than or equal to the minimum size of the memory requested and less than or equal to the maximum size of memory requested. The released set of contiguous guest memory pages may be placed in a reserved memory pool (e.g., a memory balloon).

In some implementations, responsive to failing to identify, in the list of free memory pages, a set of contiguous guest memory pages that is greater than or equal to the minimum size of memory requested and less than or equal to the maximum size of memory requested, the processing device may satisfy the memory request by allocating a part of a portion of guest memory greater than the maximum size of memory requested (e.g., break apart a portion of guest memory). In some implementations, responsive to failing to identify, in the list of free memory pages, a set of contiguous guest memory pages that is greater than or equal to the minimum size of memory requested and less than or equal to the maximum size of memory requested, the processing device may page-out a portion of guest memory. Responsive to completing the operations described herein above with references to block 506, the method may terminate.

Figure 6:
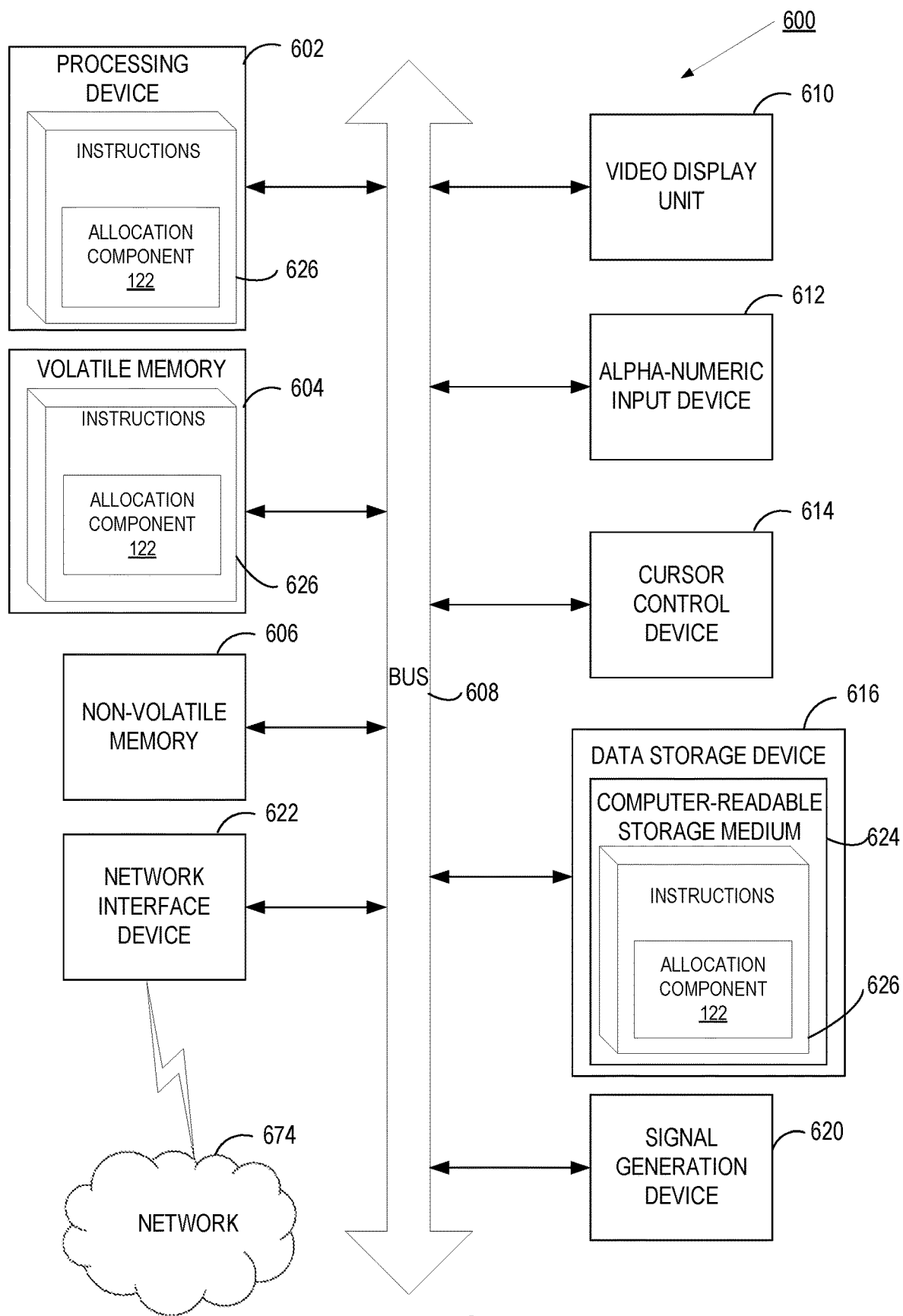
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to computing device 100 of FIG. 1 or computer system 200 of FIG. 2. The computer system may be included within a data center that supports virtualization. Virtualization within a data center results in a physical system being virtualized using execution environments to consolidate the data center infrastructure and increase operational efficiencies. A execution environment may be a program-based emulation of computer hardware. For example, the execution environment may operate based on computer architecture and functions of computer hardware resources associated with hard disks or other such memory. The execution environment may emulate a physical computing environment, but requests for a hard disk or memory may be managed by a virtualization layer of a computing device to translate these requests to the underlying physical computing hardware resources. This type of virtualization results in multiple execution environments sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 500 and for allocation component 122, and modules illustrated in FIGS. 1 and 2.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general-purpose computer system selectively programmed by a computer program stored in the computer system. Such a computer program may be stored in a computer-readable tangible storage medium.

The methods and illustrative examples described herein are not inherently related to any particular computer or other apparatus. Various general-purpose systems may be used in accordance with the teachings described herein, or it may prove convenient to construct more specialized apparatus to perform methods 300 or 500 and one or more of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   maintaining, by a host operating system (OS) of a hypervisor, a list of free memory pages associated with an execution environment, wherein each entry in the list references a set of memory pages that are contiguous in a guest address space;
   receiving, by the host OS from a management application, a request for guest memory to be made available to a hypervisor, wherein the request comprises a minimum size of guest memory requested and a maximum size of guest memory; and
   responsive to identifying, by the host OS, in the list of free memory pages, a set of contiguous guest memory pages that is greater than or equal to the minimum size of memory requested, and less than or equal to the maximum size of memory requested, releasing, by the host OS, the set of contiguous guest memory pages to the hypervisor.

2. The method of claim 1, further comprising:
   placing the released set of contiguous guest memory pages in a reserved memory pool.

3. The method of claim 1, wherein releasing the set of contiguous guest memory pages to the hypervisor is performed by a balloon driver.

4. The method of claim 1, wherein the minimum size of memory requested is a standard memory page and the maximum size of memory requested is a huge page.

5. The method of claim 1, further comprising:
   identifying, in the list of free memory pages, the smallest set of contiguous guest memory pages that is greater than or equal to the minimum size of the memory requested and less than or equal to the maximum size of memory requested.

6. The method of claim 1, further comprising:
   responsive to failing to identify, in the list of free memory pages, a set of contiguous guest memory pages that is greater than or equal to the minimum size of memory requested and less than or equal to the maximum size of memory requested, satisfying the request for guest memory by allocating a part of a portion of guest memory greater than the maximum size of memory requested.

7. The method of claim 1, further comprising:
   responsive to failing to identify, in the list of free memory pages, a set of contiguous guest memory pages that is greater than or equal to the minimum size of memory requested and less than or equal to the maximum size of memory requested, instructing the execution environment to page-out a portion of guest memory.

8. A system, comprising:
   a memory;
   a processing device operatively coupled to the memory, the processing device configured to:

maintain a list of free memory pages associated with an execution environment, wherein each entry in the list references a set of memory pages that are contiguous in a guest address space;

receive, from a management application, a request for guest memory to be made available to a hypervisor, wherein the request comprises a minimum size of guest memory requested and a maximum size of guest memory; and responsive to identifying, in the list of free memory pages, a set of contiguous guest memory pages that is greater than or equal to the minimum size of memory requested, and less than or equal to the maximum size of memory requested, releasing the set of contiguous guest memory pages to the hypervisor.

9. The system of claim 8, further comprising the processing device configured to:

placing the released set of contiguous guest memory pages in a reserved memory pool.

10. The system of claim 8, wherein releasing the set of contiguous guest memory pages to the hypervisor is performed by a balloon driver.

11. The system of claim 8, wherein the minimum size of memory requested is a standard memory page and the maximum size of memory requested is a huge page.

12. The system of claim 8, further comprising the processing device configured to:

identifying, in the list of free memory pages, the smallest set of contiguous guest memory pages that is greater than or equal to the minimum size of the memory requested and less than or equal to the maximum size of memory requested.

13. The system of claim 8, further comprising the processing device configured to:

responsive to failing to identify, in the list of free memory pages, a set of contiguous guest memory pages that is greater than or equal to the minimum size of memory requested and less than or equal to the maximum size of memory requested, satisfy the request for guest memory by allocating a part of a portion of guest memory greater than the maximum size of memory requested.

14. The system of claim 8, further comprising the processing device configured to:

responsive to failing to identify, in the list of free memory pages, a set of contiguous guest memory pages that is greater than or equal to the minimum size of memory requested and less than or equal to the maximum size of memory requested, instruct the execution environment to page-out a portion of guest memory.

15. A non-transitory machine-readable storage medium storing instructions that cause a processing device to:

maintain a list of free memory pages associated with an execution environment, wherein each entry in the list references a set of memory pages that are contiguous in a guest address space;

receive, from a management application, a request for guest memory to be made available to a hypervisor, wherein the request comprises a minimum size of guest memory requested and a maximum size of guest memory; and responsive to identifying, in the list of free memory pages, a set of contiguous guest memory pages that is greater than or equal to the minimum size of memory requested, and less than or equal to the maximum size of memory requested, release the set of contiguous guest memory pages to the hypervisor.

16. The non-transitory machine-readable storage medium of claim 15, further comprising the processing device configured to:

placing the released set of contiguous guest memory pages in a reserved memory pool.

17. The non-transitory machine-readable storage medium of claim 15, wherein releasing the set of contiguous guest memory pages to the hypervisor is performed by a balloon driver.

18. The non-transitory machine-readable storage medium of claim 15, wherein the minimum size of memory requested is a standard memory page and the maximum size of memory requested is a huge page.

19. The non-transitory machine-readable storage medium of claim 15, further comprising the processing device configured to:

responsive to failing to identify, in the list of free memory pages, a set of contiguous guest memory pages that is greater than or equal to the minimum size of memory requested and less than or equal to the maximum size of memory requested, satisfy the request for guest memory by allocating a part of a portion of guest memory greater than the maximum size of memory requested.

20. The non-transitory machine-readable storage medium of claim 15, further comprising the processing device configured to:

responsive to failing to identify, in the list of free memory pages, a set of contiguous guest memory pages that is greater than or equal to the minimum size of memory requested and less than or equal to the maximum size of memory requested, instruct the execution environment to page-out a portion of guest memory.

* * * * *